United States Patent [19]

Wise et al.

[11] 4,026,748
[45] May 31, 1977

[54] PORTABLE HAND TOOL TAPE WRAPPING METHOD, APPARATUS AND ARTICLE

[75] Inventors: Walter R. Wise, Pittsford; Ellsworth J. Allen, Newark; Donald K. Fisher, Palmyra, all of N.Y.

[73] Assignee: Garlock Inc., Palmyra, N.Y.

[22] Filed: July 3, 1975

[21] Appl. No.: 592,909

Related U.S. Application Data

[63] Continuation-in-part of Ser. No. 402,482, Oct. 1, 1973, abandoned.

[52] U.S. Cl. .............................. 156/187; 156/523; 156/577
[51] Int. Cl.² ................... B65H 81/00; B32B 31/00
[58] Field of Search .......... 156/187, 443, 446, 468, 156/490, 457, 517, 522, 523, 519, 520, 189, 577, 584, 475, 425, 212; 226/131, 129, 127, 8; 242/7.22, 7.21, 7.23; 29/157 R, 157 T

[56] References Cited

UNITED STATES PATENTS

| | | | |
|---|---|---|---|
| 1,498,894 | 6/1924 | Steenstrup | 29/157 R |
| 3,147,139 | 9/1964 | Eisenberg | 226/127 X |
| 3,320,342 | 5/1967 | Vinson et al. | 156/193 X |
| 3,328,219 | 6/1967 | Cupert | 156/189 X |
| 3,508,998 | 4/1970 | Bilbrey | 156/457 |
| 3,536,559 | 10/1970 | Pelley et al. | 156/429 |
| 3,556,903 | 1/1971 | Inka | 156/522 X |
| 3,586,582 | 6/1971 | Inka | 156/468 |
| 3,784,074 | 1/1974 | Mori | 226/127 |
| 3,861,985 | 1/1975 | Parlagreco | 156/517 |

FOREIGN PATENTS OR APPLICATIONS 426,255   3/1926   Germany ..................... 242/7.22

Primary Examiner—David A. Simmons
Attorney, Agent, or Firm—Schovee & Boston

[57] ABSTRACT

A portable hand tool for applying wrapping tape to pipe threads. The tape on a geared core is placed in a casing of the tool, the tool is clamped onto a fitting, a metering lever is advanced to feed tape into contact with the fitting, the tool is then rotated around the fitting, the tape is cut, and the tool unclamped and removed from the fitting.

42 Claims, 13 Drawing Figures

PORTABLE HAND TOOL TAPE WRAPPING METHOD, APPARATUS AND ARTICLE

CROSS REFERENCE TO RELATED APPLICATIONS

This application is a continuation-in-part application of patent application Ser. No. 402,482, filed Oct. 1, 1973 now abandoned, entitled PORTABLE HAND TAPE WRAPPING METHOD, APPARATUS & ARTICLE by Walter R. Wise, Ellsworth J. Allen & Donald K. Fisher.

BACKGROUND OF THE INVENTION

1. FIELD OF THE INVENTION

This invention relates to the hand wrapping of threaded fittings and in particular to a hand tool therefore.

2. DESCRIPTION OF THE PRIOR ART

Prior to the present invention of a portable hand tool, hand wraps were made without the use of a tool and the inadequate contact between the tape and the threads resulted in poor bonding, causing slipping and unraveling of the tape. Further, hand wrapping is subject to waste, through dirt, tearing and general handling.

It is an object of the present invention to provide a hand tool wrap giving a uniform, high-quality wrap for sealing male pipe threads in the shop and on the job site. The hand tool wrap utilizes full contact area of the threads, rather than just the crests as in previous hand wrapping, to achieve a far superior bond with excellent shelf life.

It is another object of the invention to provide a hand tool that will accommodate a variety of different standard sizes with no changing of parts.

SUMMARY OF THE INVENTION

A portable hand tool method, apparatus and article, for wrapping male pipe threads comprising a casing for holding a tape roll, a plurality of support rollers including a splined threaded start roller, means for clamping the fitting against the support rollers, means for advancing tape into the joint between the fitting and the start roller whereby when the tool is rotated around the fitting the tape is wrapped onto the pipe threads, means for cutting the tape, and means for unclamping the tool from the fitting.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DETAILED DESCRIPTION OF THE PREFERRED EMBODIMENTS

Figures 1, 1A:
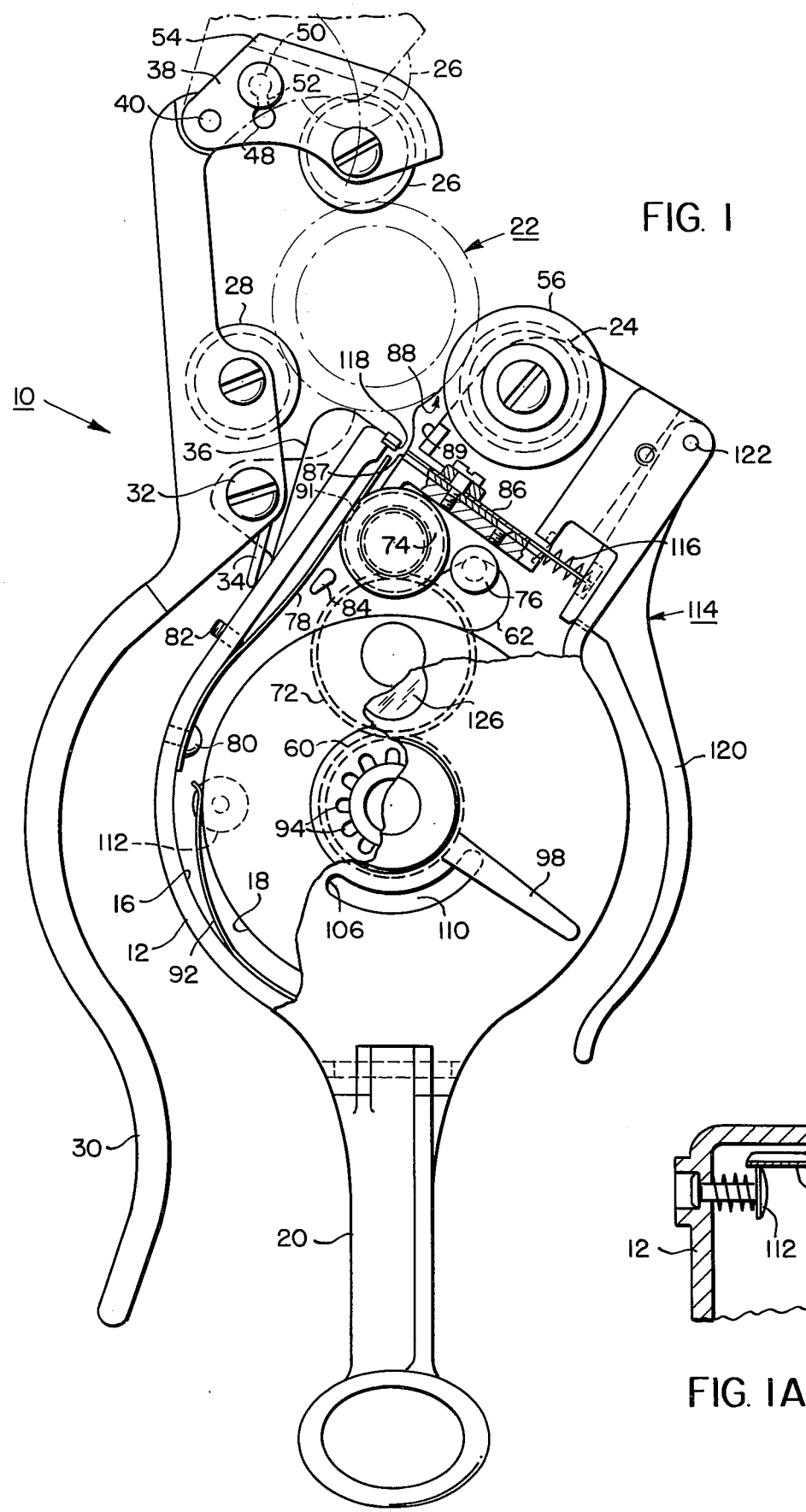
FIG. 1 is a side, partial cross-sectional view of the apparatus of the present invention.
FIG. 1A is a cross-sectional view through a portion of the apparatus of FIG. 1.
Figure 2:
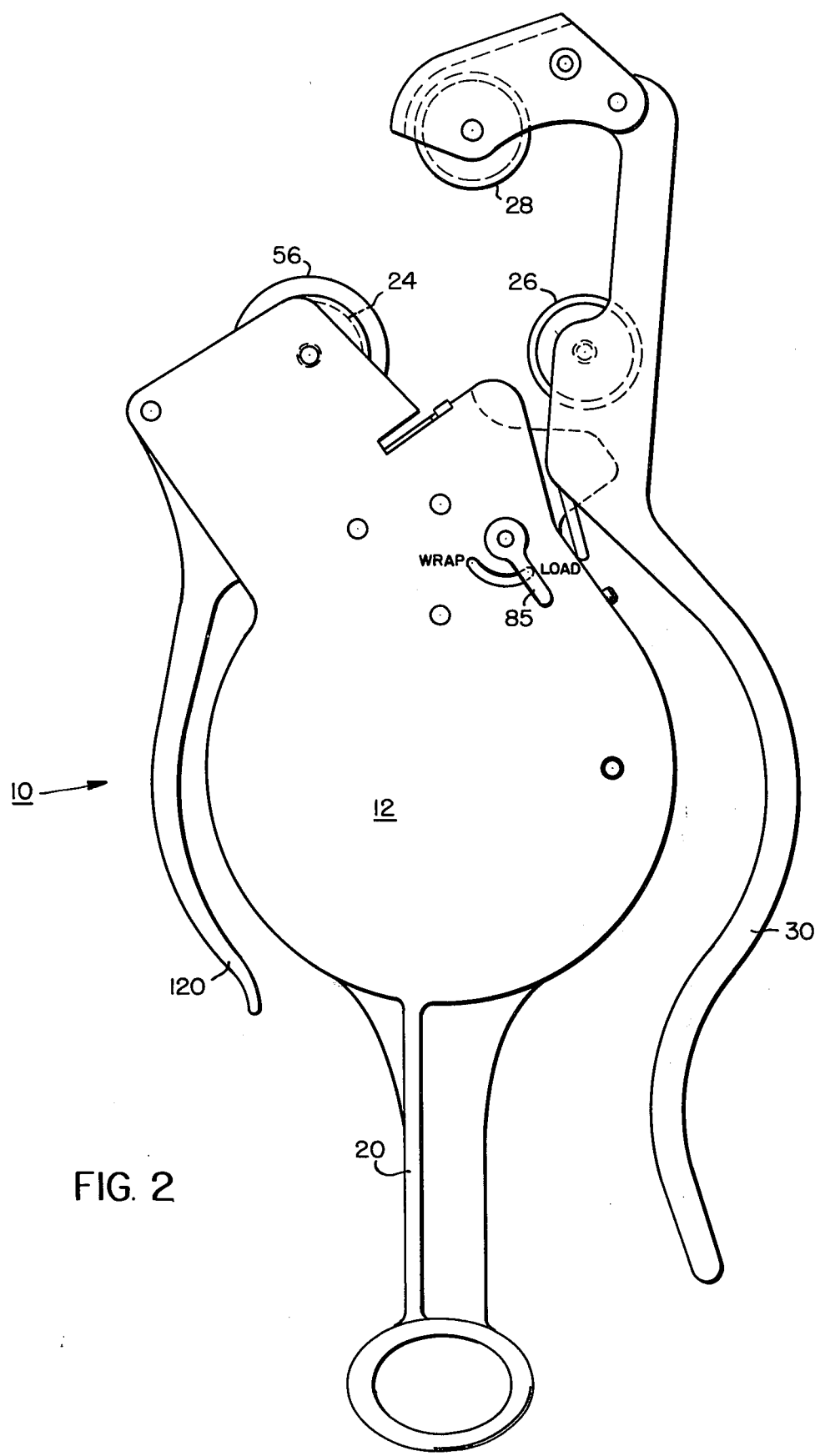
FIG. 2 is a side view of the other side of the tool of FIG.1.

With reference now to the drawings, FIGS. 1–5 show a preferred embodiment of the hand tool 10 of the present invention. The hand tool 10 includes a case 12 and a hinged cover 14 (see FIG. 4) for enclosing a tape roll chamber 16 in which a tape roll 18 is mounted for rotation. A handle 20 is connected to the case 12 for manipulating the tool 10.

The tool 10 is clamped onto the male threads of a fitting 22 between a splined (see splines 23, FIG. 3), threaded, spring-loaded, support, start roller 24 and a pair of threaded spring-loaded support rollers 26 and 28. The start roller 24 is rotatably mounted on the case 12, while the pair of rollers 26 and 28 are rotatably mounted on a clamping handle 30 pivotally connected to the case 12 at pivot 32. A clamping force spring 34 loads the pair of rollers 26 and 28, forcing them toward the start roller 24. A stop 36 on the case 12 limits clamping handle travel when no fitting is located between the rollers.

Figure 3:
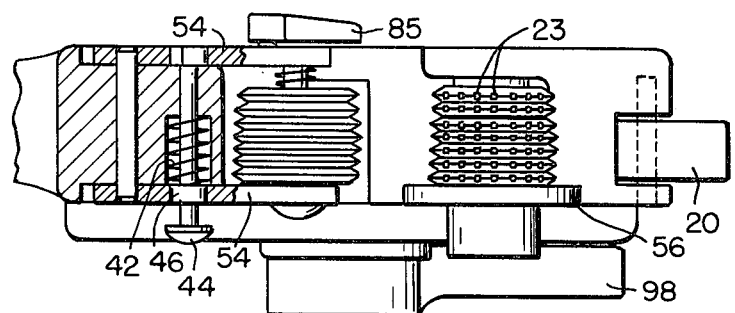
FIG. 3 is a top, partial cross-sectional view of the tool of FIG. 1.
Figure 5:
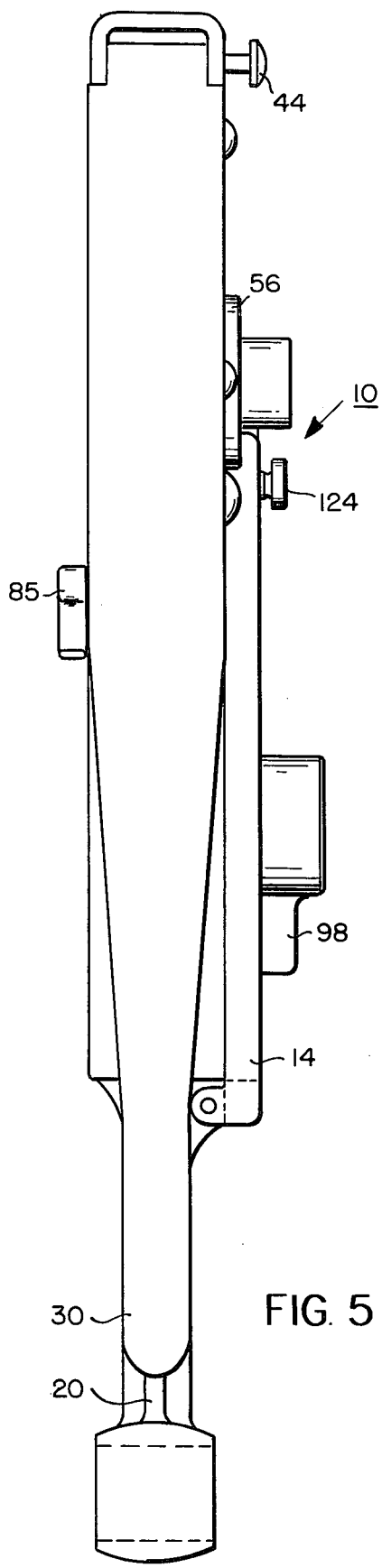
FIG. 5 is an elevational-end view of the tool as shown in FIG. 4 with the cover closed.

The roller 26 is mounted on a swivel support 38 pivotally connected to the clamping handle 30 at pivot 40. The swivel support 38 has two positions; one is shown in solid lines and one is shown in dotted lines in FIG. 1. The mechanism that permits movement and locking of the swivel support 38 is shown in FIG. 3, and includes a spring 42 loading a button 44 toward a locking position with a collar 46 seated in one of the two larger openings 48 and 50, located at each end of a slot 52 in each of a pair of side plates 54 of the swivel support 38. To move the roller 26 to its other position, the button 44 is pushed in and the swivel support moved and the button released to lock it in the other position. In one location of the roller 26, the tool 10 can accommodate standard 1inch, 1¼inches, and 1½inch pipe sizes, and in the other location of the roller, the tool can accommodate 2inch pipe sizes, with no changing of parts.

Figure 4:
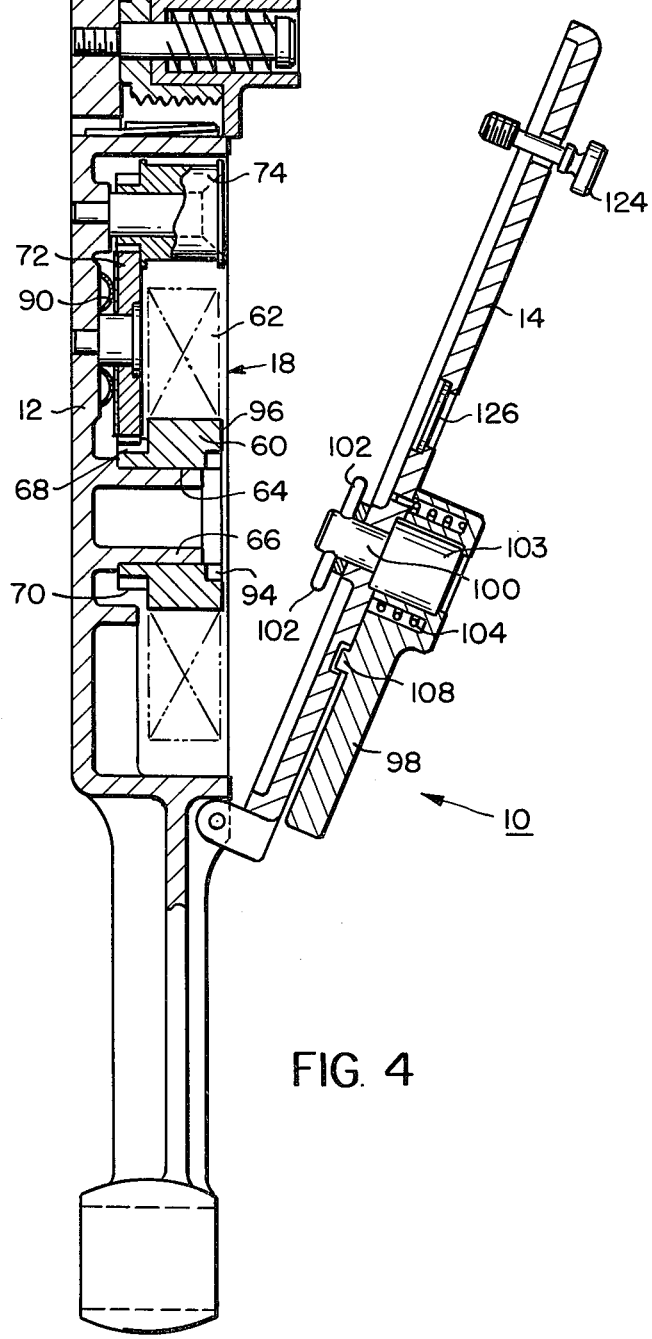
FIG. 4 is an end, partial cross-sectional view of the tool of FIG. 1.

As shown in FIG. 4, the start roller 24 is a splined, spring-loaded roller including a spring-loaded stop 56 to assist in aligning the end of the start roller 24 more or less flush with the end of the pipe thread to be wrapped.

The hand tool 10 also includes means for advancing tape from the tape roll 18 to the joint 88 in-between the fitting and the start roller 24. The tape roll 18 includes a core 60 on which a length of tape 62, preferably polytetrafluoroethylene tape, is wrapped. The core 60 has a cylindrical opening 64 therethrough for rotatably mounting the core on a cylindrical extension 66 of the case 12. The core 60 has a length greater than the width of the tape 62 and includes external gear teeth 68 on an external surface 70 thereof not covered by tape 62. The gear teeth 68 mesh with gear teeth on an intermediate gear 72, which in turn mesh with gear teeth on a splined metering feed roller 74. The intermediate gear and the metering feed roller 74 are both rotatably mounted on the case 12 as shown in FIGS. 1 and 4. A flanged guide post 76 is also mounted on the case 12 as shown in FIG. 1. A feed roll spring 78 is connected to the case 12 at 80 and is biased away from the feed roller 74 but is adjustably forced toward the feed roller 74 by an adjustment screw 82. An eccentric 84 is mounted on the case 12 adjacent the feed roll spring 78 for moving the spring away from the feed roller 74 to permit threading of the tape 62 in-between the feed roller 74 and spring 78 up to a cutting blade 86. An actuating lever 85 is connected to the eccentric 84 for moving it between a "wrap" and "load" orientation.

As shown in FIG. 1, the tape 62 feeds from the roll 18, around the flanged guide post 76, to in-between an area of contact 91 between the feed roller 74 and feed roll spring 78, past a first land 87 that helps to guide the tape out of the case 12, past the cutter blade 86 and past a second land 89 that guides the tape into the joint 88 between the fitting and the start roller. As shown in FIG. 1, the tape 62 is buckled because of a "designed inventory" of tape existing between the area of contact 91 and the joint 88, and the tape is therefore in a state of compression between the area of contact 91 and the joint 88. The term "designed inventory" is hereby defined to mean that length of tape between two points in excess of the length needed to extend in a straight line between the two points. In this way, when rotation of the tool 10 around the fitting 22 begins (or the fitting is rotated within a stationary tool) the tape 62 will seek and find the spline roots of the splined start roller 24, thereby guaranteeing that the tape will start to wrap. Also, during the wrap start, there is "free" tape (see FIG. 1) between the tape roll 18 and the feed roller 74. This ensures that there will be no tensile force on this portion of the tape 62 during the critical wrap start. As soon as the start is assured, this inventory is exhausted, and tape fouling is prevented by a brake 90 (see FIG. 4, brake 90 preferably comprises spring-loaded friction material bearing against the intermediate gear 72), plus the brake action of an anti-fouling spring 92 (see FIG. 1). The brake 90 and the anti-fouling spring 92 impose a sufficient tensile force on the entire tape train to prevent tape fouling and to induce the tracking needed to make sure that, upon cut-off, the tape will be in the proper position for making the next start. The "free" tape requirement is always satisfied even though the diameter of the tape roll 18 is changing continuously during tape roll depletion.

The means for advancing the tape through the above-described tape train will now be described. The core 60 also includes a plurality of radial grooves 94 in a front surface 96 thereof. The cover 14 includes a spring-return, stop-limiting lever 98 connected by a shaft 100 extending through the cover 14 to a pair of pins 102 that are received in a pair of opposing ones of the grooves 94. The lever 98 is connected to the shaft through a one-way clutch 103; the clutch 103 allows the pins 102 and the tape roll 18 to remain in their new location as the lever 98 returns to its original or start position. A return spring 104 biases the lever 98 to its normal position shown in FIG. 1 and a stop 106 contacting flange 108 riding in a groove 110 defines the limit of travel of the lever 98. When the tool 10 is clamped onto a fitting 22, the lever 98 is moved as far as it will go by the operator, causing the tape to be advanced to the position shown in FIG. 1 to provide a designed inventory of tape between the tape roll 18 and the joint 88, thus providing the above mentioned "buckling" mode and free tape.

After depletion and removal of a used tape roll, the anti-fouling spring 92 is manually pushed out of the way and held there by a spring-loaded button 112 (see FIG. 1A) that retains the spring 92 out of the way during insertion of a new roll; insertion of a new roll automatically releases the spring upon completion of insertion of a new tape roll 18. The cover 14 has a window 126 therein for viewing tape inventory.

The tape cutter 114 of the tool 10 includes a cutting blade 86 biased by a spring 116 out of the path of travel of the tape 62. The blade 86 is moved toward an edge 118 to cut the tape 62 by a spring-loaded lever 120, pivotally connected to the case 12 at 122.

In operation, the cover 14 is opened and the button 112 is used to hold the spring 92 out of the way of the new tape roll 18 which is inserted into the chamber 16. The eccentric 84 is rotated to move the spring 78 out of contact with the feed roller 74, and the distal end of the new tape 62 is threaded around the flanged guide post 76 and the metering feed roller 74 and up to at least the cutting blade 86. The lever 98 is then turned slightly if necessary so that the cover 14 can be closed (and locked by a thumb screw 124, see FIG. 4) with each pin 102 in a groove 94. The handles 20 and 30 are then closed, opening the jaws of the tool 10; the rollers 24, 26, and 28 are then placed on the fitting 22, and the handles 20 and 30 are then released clamping the tool onto the fitting. The metering lever 98 is then turned clockwise through its full travel (about 90°) thereby metering tape 62 to the joint 88, and simultaneously producing the tape buckling mode and the tape unwinding mode, both of which modes constitute free tape inventories both before and after the feed roller 74.

Then, by use of the case handle 20, the tool 10 is rotated for one or more complete turns as may be required. The cutter lever 120 is then depressed to cut the tape 62, and the tool is rotated a sufficient amount to use up the cut end of the tape and thus to complete the wrap. The tool 10 is then removed from the fitting 22 and is ready for the next wrap.

A most important aspect of this invention is the reliability in both starting and completing the wrap, achieved by the metering system. The manner in which an inventory of free tape, before and after the feed roller, is established has been discussed above. Further, upon relative motion of the pipe thread crests with respect to the tape surface, a shearing force is generated. Thus, when rotation of the tool 10 about the pipe fitting 22 is initiated: (a) the compressive and and shearing forces are brought to bear, (b) the tape seeks and finds the roots of the splines of start roller 24 and, (c) the tape will start to wrap. During the wrap start, since there is free tape between the tape roll 18 and the feed roller 74, there is no tensile force on this portion of the tape 62 during the critical wrap start. As soon as the start is assured, the inventory is exhausted, and the brake 90 in the gearing plus the brake action of the anti-fouling spring 92 impose a sufficient tensile force on the entire tape train to prevent tape fouling and to induce the tracking needed to make sure that, upon cut-off, the tape 62 will be in the proper position for making the next start. The free tape requirement is always satisfied even though the diameter of the tape roll is changing continuously during tape roll depletion.

It is noted that the net tensile force maintained on the tape 62 while wrapping, is quite constant even though the diameter of the tape roll is continuously decreasing with tape roll depletion. This is achieved through a two-part partition of correlative torques: the constant torque exerted via the spring-loaded intermediate gear 72 and the variable torque exerted by the anti-fouling spring 92. For the constant torque, the tape tensile force increases during wrapping as the tape roll is depleted and the moment arm decreases. For the variable-torque, anti-fouling spring 92, however, the force normal to the tape surface decreases during wrapping as the tape roll 18 is depleted and the moment arm decreases.

In the tool 10, the constant torque and the anti-fouling spring rate are selected to yield a nearly-constant, net tensile force during the entire range of tape depletion.

Figure 6:
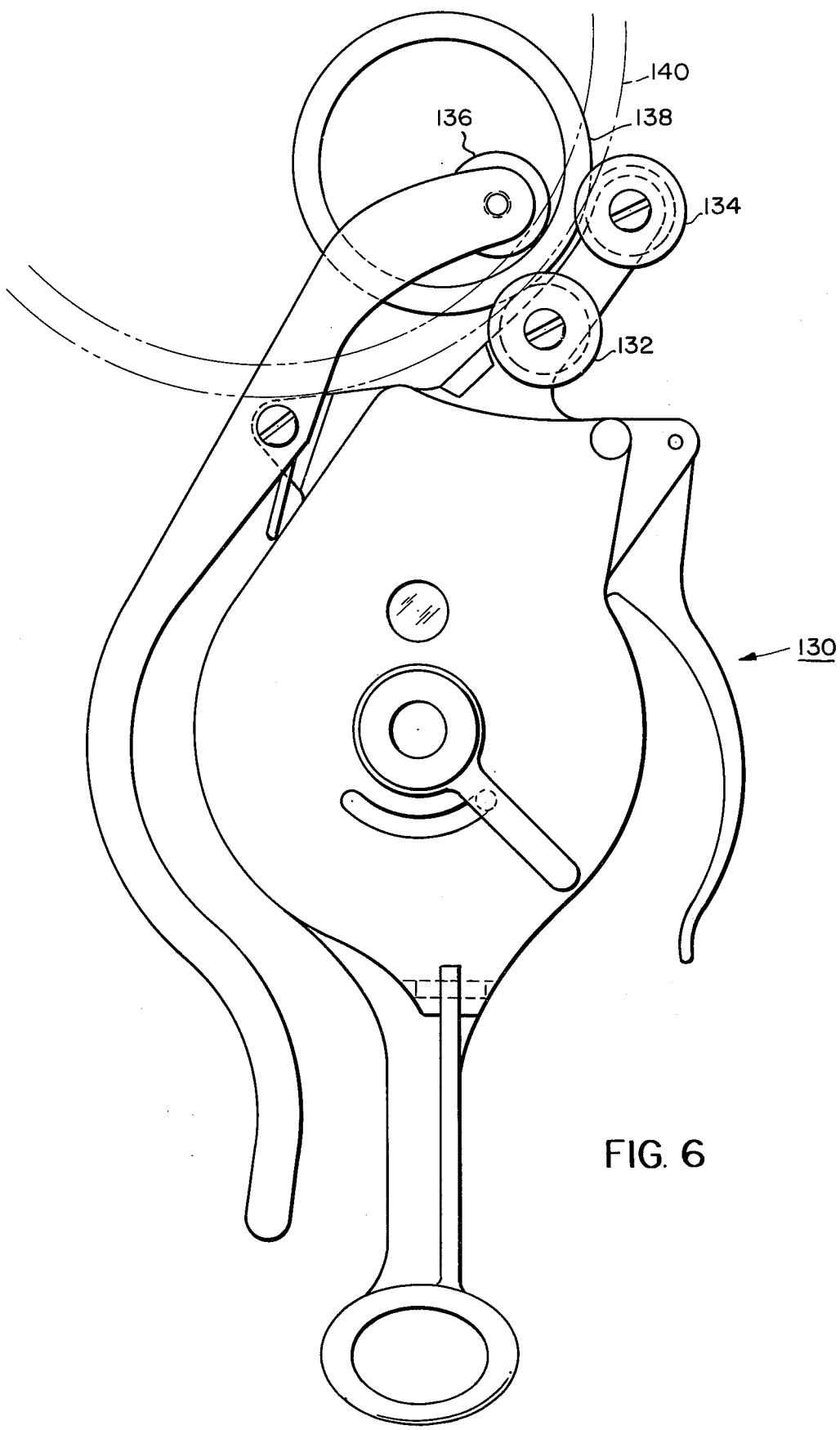
FIG. 6 is a side view of another embodiment of the hand tool of the present invention.

FIG. 6 shows another embodiment of the tool of the present invention. In this embodiment, an entire fitting 138 is not clamped in the jaws of the tool, but only a segment of the fitting is clamped. The tool 130 has a start roller 132, another roller 134, and an internal elastomeric roller 136. This arrangement requires fewer parts, requires less handle travel, can accommodate a wide range of large pipes (such as a pipe 140 shown in dotted lines), and obviates the need for large clamping arms and rollers.

Figure 7:
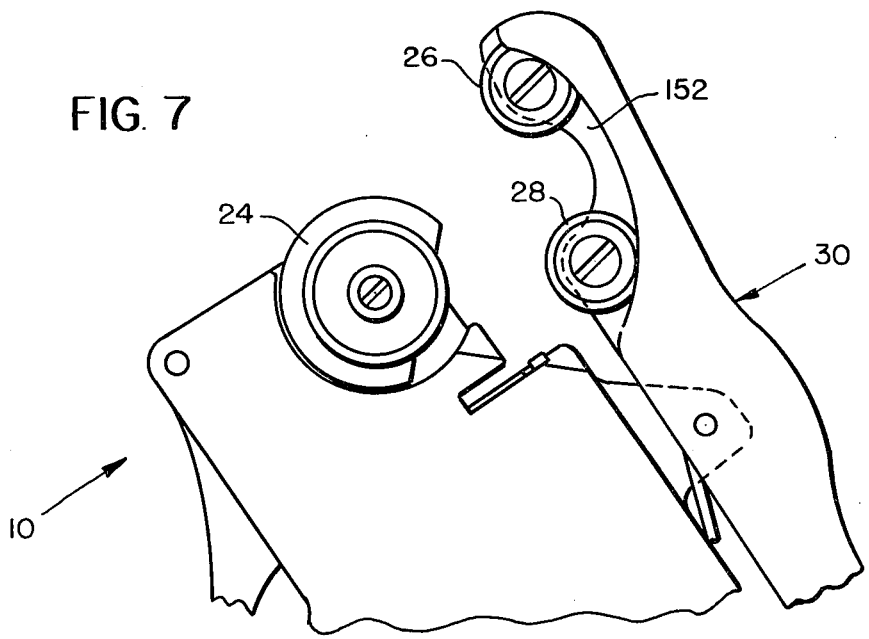
FIGS. 7 and 8 are side and top views respectively, of another embodiment of the invention having cantilevered rollers.
Figure 8:
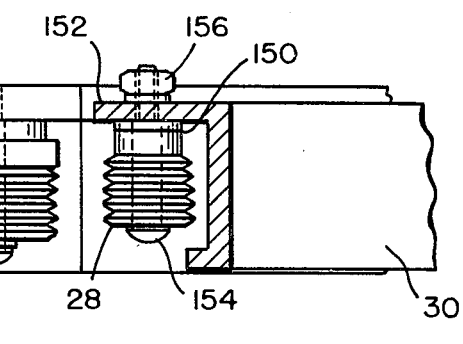

FIGS. 7 and 8 show another embodiment of the present invention. The only difference between this embodiment and that of FIGS. 1–5 is that all three rollers 24, 26 and 28 in this embodiment are cantilevered for support from the same side of the tool 10. Roller 28 is shown in FIG. 8, for example, supported only at its end 150 on flange 152 of the handle 30 by means of a bolt 154 and nut 156, for example. Similarly, the other rollers 26 and 24 are cantilever mounted on the hand tool 10. This embodiment of the invention is useful in those applications of the invention in which the threaded fitting to be wrapped has an enlargement such as a flange or nut in close proximity to the distal end of the fitting such that various parts of the tool of FIG. 1–5, particularly the supports at the ends of the rollers, can contact the enlargement and prevent the fitting from being inserted a sufficient distance in-between the roller to accomplish the wrapping, or prevent the tool from advancing along the threads and completing the job of wrapping. This embodiment of the invention removes the obstructions on the tool (by removing all supporting structure from one end of each roller) and thus allows, for example, the tool to advance along the fitting to wrap it.

Figure 9:
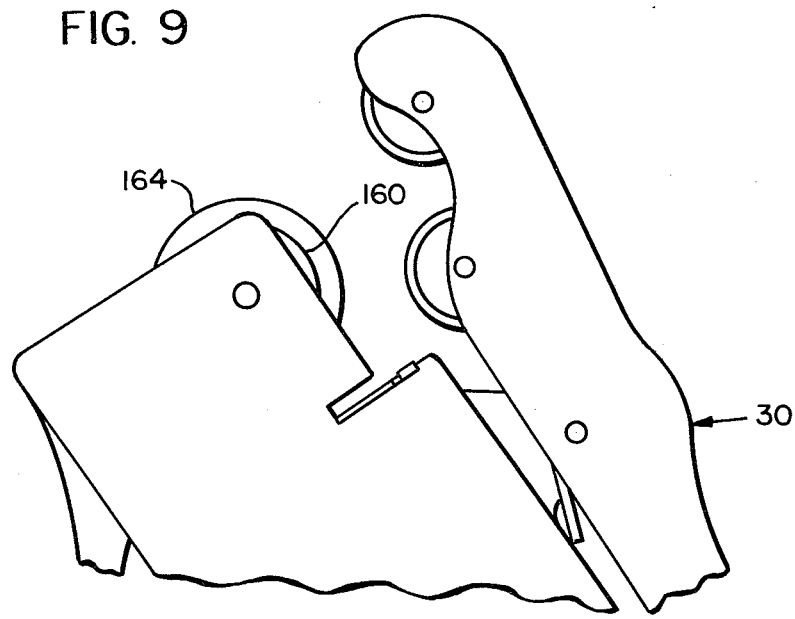
FIGS. 9 and 10 are side and top views respectively of another embodiment having an adjustable stop on the start roller.
Figure 10:
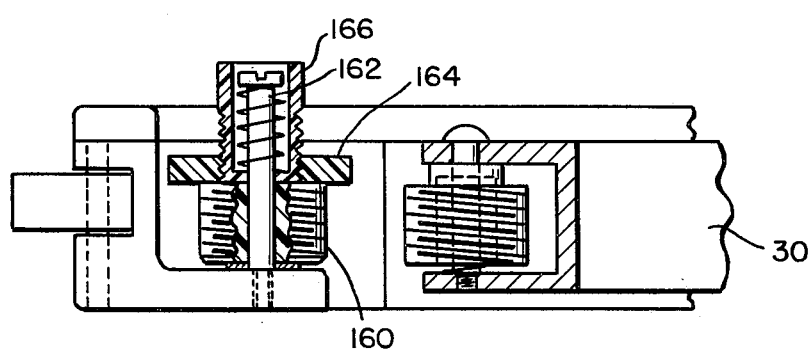

FIGS. 9 and 10 show another embodiment of the present invention. This embodiment is identical to that shown in FIGS. 1–5 except that in FIGS. 9 and 10 there is an adjustable stop flange 164 on the start roller 160. FIG. 10 shows a spring-loaded stop 166 and the adjustable stop flange 164 in threaded engagement with external screw threads on the stop 166. The stop 166 and the roller 160 are both freely rotatably mounted on pin 162. The adjustable stop flange 164 can thus be moved axially as desired along the stop 166 and can thus be moved axially with respect to the start roller 160 (approximately ⅛ inch) to control where, on the distal end of a fitting, the tape will be applied.

In any of the embodiments of the present invention, the threads of the three rollers can be left hand threads, if desired, whereby when the tool is rotated around a fitting with the same diameter as that of the rollers there will be no axial movement of the tool with respect to the fitting having right hand threads, whereby the tool can be rotated around the fitting as many times as desired to wrap it. This is useful when the fitting has an obstruction that would prevent advancement (and would therefore prevent wrapping). Such advancement occurs, for example, when the three rollers of the tool have no lead and the tool is rotated around a fitting having right hand threads. If the diameter of a right hand thread fitting is less than that of the rollers, left-hand thread rollers will advance axially upon the fitting; if the fitting diameter is greater than that of the rollers, the rollers will retreat. Variations of fitting-roller diameters can be employed to decrease or increase axial advance or retreat of the rollers upon the fitting as the application may require. Multiple thread configurations can be employed to accelerate axial advance or retreat of the rollers upon the fitting as desired. Consistent with the foregoing, right-hand thread rollers may be employed gainfully to wrap left-hand thread fittings.

Figure 11:
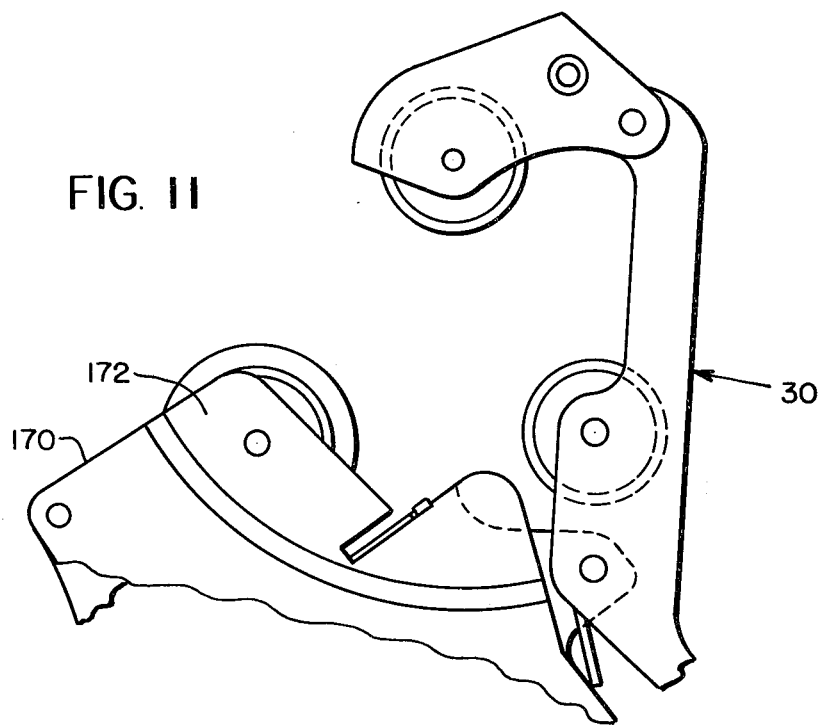
FIGS. 11 and 12 are side and top views of another embodiment of the invention having a relief on the housing.
Figure 12:
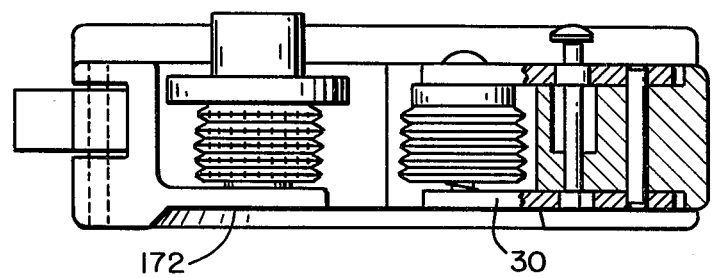

FIGS. 11 and 12 show another embodiment of the present invention which is identical to that of FIGS. 1–5 except that the housing 170 is provided with a relief 172. The purpose of the relief 172 is similar to that for the cantilevered rollers of FIGS. 7 and 8; that is, some fittings have an enlargement that can contact the tool housing and can prevent complete wrapping of the fitting. The relief 172 is sufficient to allow complete wrapping of certain fittings that would otherwise contact the housing and prevent complete wrapping. The relief 172 can be used in conjunction with the cantilevered rollers of FIGS. 7 and 8, and with any other embodiments, if desired.

Another embodiment (not shown) includes a motor for attachment to powered pipe threaders. Each of these additional embodiments includes the metering and other basic components of the tool 10 of FIGS. 1–5.

The tape 62 is preferably a 1000-inch roll of 5 mil thick, 1.5 density, ½ inch wide tape. While the fitting 22 has been described above as a pipe with male threads, it is noted that this invention also applies to male threaded fittings other than pipe. Also, the invention includes the use of various tape compositions, thicknesses, widths, lengths, densities, and tensiles as may be indicated for the size and type of male threaded fittings under consideration.

The rollers 24, 26 and 28 are threaded to mate with the male threading of the fitting; the term "threaded" as used herein includes a thread with no lead. The three support rollers 24, 26, and 28 are slightly frusto-conical to better mate with the fitting; in FIG. 4, the start roller 24 tapers from a larger O.D. on the right to a smaller O.D. on the left. The start roller 24 preferably has seven full threads with no lead and a plurality of saw-cut serrations equally spaced on the O.D. In the preferred embodiment, there are thirty serrations, each about 1/32 inch wide and about 1/32 inch deep, and each extending longitudinally of the axis of the fitting. All four of the pipe sizes, 1 inch, 1 ¼ inches, 1 ½ inches and 2 inches have 11 ½ threads per inch; they are threaded for about 1 inch and as made up on the job employ about ½ inches of the threaded portion. Of the theoretical 11 ½ threads, only about 9 are fully cut. The support rollers 24, 26 and 28 have fewer threads (in the preferred embodiment they have seven threads)

so that by starting wrapping with the roller faces flush with the pipe faces, the tool in the preferred embodiment employs about two turns per wrap. The three support rollers 24, 26 and 28 are preferably made of polytetrafluoroethylene.

The invention has been described in detail with particular reference to the preferred embodiments thereof, but it will be understood that variations and modifications can be effected within the spirit and scope of the invention as described hereinabove and as defined in the appended claims.

We claim:

1. A portable hand tool for wrapping a male threaded fitting comprising:
   a. a portable tool case;
   b. means for rotatably supporting a roll of wrapping tape on said case;
   c. a threaded support start roller rotatably mounted on said case at a stationary location thereon relative to said case;
   d. means on said case for clamping male threads of a fitting against said start roller;
   e. means mounted on said case for feeding a distal end of said tape in-between said start roller and a fitting clamped thereto, said feeding means including a lever on the outside of said case located for manual actuation for feeding a distal end of said tape in-between said start roller and a fitting clamped thereto, whereby upon manually rotating said case around a stationary fitting, said tape is wrapped around the male threads of a fitting; and
   f. means mounted on said case for cutting said tape, said cutting means including a lever on the outside of the case located for manual actuation for cutting said tape.

2. The tool according to claim 1 wherein said start roller is a splined start roller.

3. The tool according to claim 2 wherein the threads on said start roller have no lead.

4. The tool according to claim 1 wherein said supporting means includes a hinged cover connected to said case and enclosing a tape roll chamber for receiving a tape roll, and including a spindle therein for rotatably mounting a tape roll.

5. The tool according to claim 4 including a tape roll in said chamber and mounted on said supporting means, said tape roll including a length of tape wound on a tape roll core, said core having a length greater than the width of said tape and external gear teeth on an external surface of said core not covered by said tape, and wherein said tape feeding means includes a metering feed roller having gear teeth, and intermediate gear means between said core and feed roller for causing said feed roller to rotate when said core rotates, and means on said supporting means for rotating said core.

6. The tool according to claim 5 including a flanged guide post located in the tape path between said tape roll and said feed roller.

7. The tool according to claim 5 including adjustable means in said chamber for supplying resistance to tape feed.

8. The tool according to claim 7 wherein said adjustable means is a leaf spring biased away from a tape feeding surface of said tape feed roller and an adjustment screw for forcing said leaf spring toward said feed roller.

9. The tool according to claim 5 wherein said means on said supporting means for rotating said core comprises a tape metering device mounted on said cover and including a pin inside of said cover for mating with a groove in said core; and a lever on the outside of said cover connected to said pin by a rotatable shaft extending through said cover.

10. The tool according to claim 9 including a spring for returning said lever to a starting position after tape has been metered.

11. The tool according to claim 10 including a stop for contacting said lever after it has rotated a certain distance from said starting position.

12. The tool according to claim 4 including a transparent tape viewing port in said cover.

13. The tool according to claim 4 wherein said case includes a relieved side portion adjacent said start roller to prevent a fitting to be wrapped by said tool from contacting said case prior to completion of wrapping.

14. The tool according to claim 1 wherein said clamping means includes a pair of rollers, and means for moving said pair of rollers toward and away from said start roller for clamping and unclamping a fitting to said tool.

15. The tool according to claim 13 wherein said rollers of said pair of rollers are threaded.

16. The tool according to claim 15 wherein said start roller and said pair of threaded rollers have left hand threads.

17. The tool according to claim 15 wherein said start roller and said pair of rollers are all cantilevered for support on the same side of said case.

18. The tool according to claim 15 wherein said moving means includes an arm pivotally connected to said case and wherein said pair of rollers are on one side of said pivot connection and a clamping arm portion is on the other side of said pivot connection.

19. The tool according to claim 18 wherein said start roller and said pair of threaded rollers have left hand threads.

20. The tool according to claim 18 wherein said start roller and said pair of rollers are all cantilevered for support on the same side of said case.

21. The tool according to claim 15 including means for moving one of said pair of rollers with respect to the other for clamping different size fittings with said tool.

22. The tool according to claim 1 wherein said clamping means comprises a pair of rollers mounted in a stationary location relative to said case, one of which pair is said start roller and a third roller movably mounted on said case with respect to said pair of rollers.

23. The tool according to claim 22 wherein said third roller is an elastomeric roller.

24. The tool according to claim 22 wherein said third roller is positioned such that it can be located inside of a hollow fitting.

25. The tool according to claim 1 including means mounted on said case for imposing a sufficient tensile force on said tape to prevent tape fouling.

26. The tool according to claim 25 wherein said imposing means includes means for imposing a substantially constant tensile force on said tape as the diameter of the tape roll is continuously decreasing with tape roll depletion.

27. The tool according to claim 25 wherein said start roller is a splined start roller.

28. The tool according to claim 1 wherein said start roller has left hand threads whereby rotation of said case around a fitting will not advance said case axially along said fitting.

29. The tool according to claim 1 wherein said start roller includes an adjustable stop whereby said stop can be moved axially with respect to said start roller.

30. The tool according to claim 1 wherein said start roller is cantilevered.

31. A method for wrapping male threads of a fitting with tape comprising:
 a. providing a portable hand tool having a portable tool case, a roll of tape, a rotatable threaded support start roller in fixed position on said case, and means for manually clamping said fitting against said start roller,
 b. placing said fitting against said start roller and manually moving said clamping means against said fitting to clamp it between said clamping means and said start roller,
 c. manually feeding an end of said tape toward and into said contact with a joint between said fitting and said start roller by manually moving a tape feeding lever on the outside of said case, said feeding step including placing said tape under a compressive force toward said fitting, and
 d. manually rotating said case around said fitting for wrapping said tape onto said male threads.

32. The method according to claim 31 wheein said clamping step comprises clamping said tool onto said fitting with a splined, threaded, start roller in contact with said male threads.

33. The method according to claim 32 including the step of cutting said tape by manually moving a cutting lever on the outside of said case, continuing the rotating step to wrap with the cut and unwrapped tape, and then unclamping said tool from said fitting.

34. The method according to claim 32 wherein said feeding step includes providing a designed inventory of tape between said tape roll and said joint.

35. The method according to claim 34 including applying a braking force to said tape during said rotating step to prevent tape fouling.

36. The method according to claim 35 wherein said clamping step includes clamping said tool onto said fitting between said start roller and a pair of rollers.

37. The method according to claim 36 including providing said start and threaded rollers with left handed threads whereby said rotating step does not advance said tool axially on said fitting.

38. The method according to claim 36 wherein said start roller and said pair of rollers are all cantilevered for support on the same side of said tool.

39. The method according to claim 31 wherein said clamping step comprises clamping a segment of a hollow fitting between said support roller and an internal roller movable with respect to said support roller, and position said internal roller inside of said fitting.

40. The method according to claim 31 including applying a braking force to said tape during said rotating step to prevent tape fouling.

41. The method according to claim 40 wherein said applying step comprises applying a substantially constant force as the diameter of the tape roll is continuously decreasing with tape roll depletion.

42. The method according to claim 40 wherein said clamping step comprises clamping said tool onto said fitting with a splined, threaded, start roller in contact with said male threads.

* * * * *